United States Patent
Lee et al.

(10) Patent No.: US 9,050,905 B2
(45) Date of Patent: Jun. 9, 2015

(54) ELECTRONIC PARK BRAKE SYSTEM FOR ELECTRIC VEHICLES

(71) Applicant: Brammo, Inc., Ashland, OR (US)

(72) Inventors: Charles R. Lee, Talent, OR (US);
Joseph I. Keto, Ashland, OR (US);
George Alter, Ashland, OR (US);
Matthew D. Nelson, Ashland, OR (US)

(73) Assignee: Brammo, Inc., Talent, OR (US)

( * ) Notice: Subject to any disclaimer, the term of this patent is extended or adjusted under 35 U.S.C. 154(b) by 0 days.

(21) Appl. No.: 14/167,397

(22) Filed: Jan. 29, 2014

(65) Prior Publication Data
US 2014/0297074 A1 Oct. 2, 2014

Related U.S. Application Data

(60) Provisional application No. 61/759,084, filed on Jan. 31, 2013.

(51) Int. Cl.
*G06F 17/00* (2006.01)
*B60L 15/20* (2006.01)

(52) U.S. Cl.
CPC .......... *B60L 15/2009* (2013.01); *Y02T 10/7275* (2013.01)

(58) Field of Classification Search
CPC ... H01S 5/0655; H01S 5/1028; H01S 5/1237; H01S 5/22; B62K 5/025
USPC .......................................... 701/22; 180/65.1
See application file for complete search history.

(56) References Cited

U.S. PATENT DOCUMENTS

| | | | |
|---|---|---|---|
| 5,644,202 A * | 7/1997 | Toriyama et al. | 318/369 |
| 5,908,453 A * | 6/1999 | Tabata et al. | 701/22 |
| 8,265,814 B2 * | 9/2012 | Cominetti | 701/22 |
| 8,761,984 B2 * | 6/2014 | Yates et al. | 701/22 |
| 2005/0016780 A1* | 1/2005 | Richey et al. | 180/65.1 |
| 2010/0127840 A1* | 5/2010 | Chen | 340/425.5 |
| 2012/0080249 A1* | 4/2012 | Yates et al. | 180/65.31 |
| 2012/0138375 A1* | 6/2012 | Hughes | 180/65.1 |
| 2013/0090795 A1* | 4/2013 | Luke et al. | 701/22 |
| 2013/0226381 A1* | 8/2013 | Yates et al. | 701/22 |

\* cited by examiner

*Primary Examiner* — McDieunel Marc
(74) *Attorney, Agent, or Firm* — Rajesh Vallabh; Foley Hoag LLP

(57) ABSTRACT

A method and apparatus are provided for securing an electric vehicle from unwanted movement when the electric vehicle is parked. The electric vehicle includes a drive wheel and an electric motor for driving the drive wheel. The method includes the steps of: (a) placing the electric vehicle in an electronic park brake mode; (b) automatically detecting that the electric vehicle is rolling from an initial position; and (c) automatically causing the electric motor to apply a reverse torque to the drive wheel to return the electric vehicle to the initial position or automatically causing the electric motor to lock the drive wheel to inhibit further movement of the electric vehicle.

24 Claims, 3 Drawing Sheets

ELECTRONIC PARK BRAKE SYSTEM FOR ELECTRIC VEHICLES

CROSS REFERENCE TO RELATED APPLICATION

This application claims priority from U.S. Provisional Patent Application No. 61/759,084 filed on Jan. 31, 2013 entitled ELECTRONIC PARK BRAKE SYSTEM FOR ELECTRIC VEHICLES, which is hereby incorporated by reference.

BACKGROUND

The present application relates generally to electric vehicles such as, e.g., electric motorcycles, tricycles, and all-terrain vehicles (ATVs). More particularly, the application relates to an electronic park brake system for such vehicles.

Unlike automobiles with enclosed passenger cabins that can be securely locked, two-wheeled vehicles (e.g., motorcycles or scooters) and three-wheeled vehicles (e.g., ATVs) have no such security. As a result, the operational controls are freely exposed for unauthorized use if the vehicle is left on. The vehicle can be turned off, but starting an electric vehicle takes time, which can be an impediment to use—especially by police and other security or emergency response personnel.

Electric vehicles have a lengthy start-up or initialization period because the vehicle's electronic system has to boot-up, perform system self-checks, and analyze and determine the state of the battery system(s). The initialization process of the electrical system is complex and requires time to perform the various necessary tasks. Once past start-up with everything initialized, electric vehicles are very quick in responsiveness.

Electric motors used in electric vehicles have a low mechanical load on the drivetrain, and the vehicle can be easily rolled forward or backwards while it is off. Unauthorized movement of the vehicle can therefore be a problem. Even if in gear, the motor shaft spins freely when off, so there is no mass to lock the vehicle's drivetrain.

BRIEF SUMMARY OF THE DISCLOSURE

In accordance with various embodiments, methods and apparatus are provided to allow an almost instantaneous start-up of electric vehicles, while providing security to prevent unauthorized access to the vehicle's controls. The methods and apparatus use the vehicle's motor controller to prevent someone from trying to move the vehicle while it is locked, but yet allow an authorized driver to unlock and drive immediately without waiting for the vehicle to start up as the system is already initialized with the motor drive pre-charged and ready to go. In addition, the methods and apparatus allow electric motorcycles to be parked on a downhill plane with substantially reduced risk of a motorcycle rolling off its kickstand.

In accordance with one or more embodiments, a method is provided for securing an electric vehicle from unwanted movement when the electric vehicle is parked. The electric vehicle includes a drive wheel and an electric motor for driving the drive wheel. The method includes the steps of: (a) placing the electric vehicle in an electronic park brake mode; (b) automatically detecting that the electric vehicle is rolling from an initial position; and (c) automatically causing the electric motor to apply a reverse torque to the drive wheel to return the electric vehicle to the initial position or automatically causing the electric motor to lock the drive wheel to inhibit further movement of the electric vehicle.

In accordance with one or more embodiments, an electric vehicle is provided comprising a battery system for powering the electric vehicle, a drive wheel, an electric motor mechanically coupled to the drive wheel for driving the drive wheel, and a vehicle control unit for controlling operation of the electric motor through a motor controller. The vehicle control unit is operable to secure the electric vehicle from unwanted movement when the electric vehicle is parked. The vehicle control unit is configured to: (a) place the electric vehicle in an electronic park brake mode; (b) automatically detect that the electric vehicle is rolling from an initial position; and (c) automatically cause the electric motor to apply a reverse torque to the drive wheel to return the electric vehicle to the initial position or automatically cause the electric motor to lock the drive wheel to inhibit further movement of the electric vehicle.

DETAILED DESCRIPTION

Figure 1:
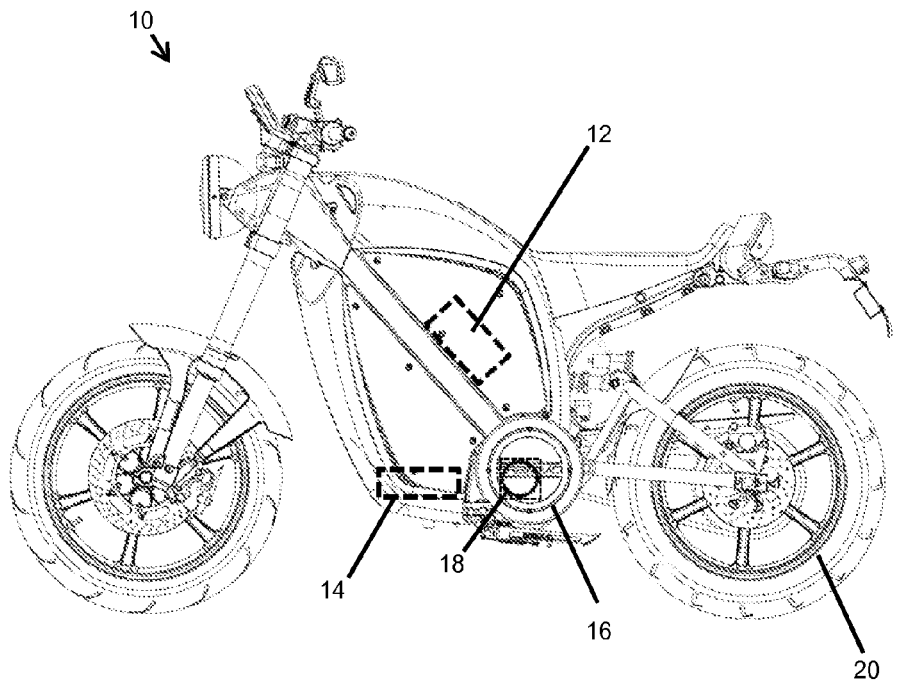
FIG. 1 illustrates an exemplary electric motorcycle in which the electronic park brake system in accordance with one or more embodiments may be implemented.

Various embodiments disclosed herein are directed to methods and apparatus for placing an electric vehicle into an electronic park state by using the motor controller to prevent the electric vehicle from moving forward or backwards until an authorized unlock device or signal (e.g., mechanical key or RFID or Bluetooth signal) is detected by the electric vehicle. If the vehicle is forcibly moved forward when in the electronic park state, the motor controller will detect movement from the motor rotation, and provide a reverse torque to the wheel to keep the vehicle in the same position. Similarly, when the vehicle is moved forcibly backwards, the motor controller will detect the movement from the motor rotation, and provide a forward torque to the motor to keep the vehicle in the same position. Unlike internal combustion engines, an electric motor can spin in both directions and thus spin the drive wheel in both directions without having to shift gears. The net result is that the drive wheel can be used to keep the vehicle in the position—and at the same time the entire vehicle is powered up and ready to drive once an authorized unlock signal or device input is received.

The electronic park brake system in accordance with one or more embodiments has several advantages, including some or all of the following. It is a secure way of locking an open vehicle such as an electric motorcycle or ATV. There is no mechanical mechanism that can be bypassed or broken open. In addition, unlike mechanical methods that can accidentally be deployed (e.g., a mechanical brake lock) while driving, the electronic park brake in accordance with one or more embodiments cannot be deployed until the vehicle is at zero speed. Furthermore, unlike mechanical mechanisms, there is no additional cost to the drive system (other than any decoding of the lock/unlock signal). There are no bolts, springs, solenoids, or other mechanical additions to the vehicle. Also, no weight is added to the vehicle as a result of the electronic park brake apparatus as it uses components already in place on the electric vehicle.

As the locking technique is implemented in software, the enabling/disabling of the Electronic Park mode can be accomplished by a variety of methods, and can be left up to the vehicle's manufacturer as to how to best implement this feature in a given vehicle.

Unlike conventional internal combustion engines, electric motors have little internal mass to park a vehicle on steep inclines. In particular, electric motorcycles when parked downhill have a tendency to roll forward and off the kickstand, thereby falling off the kickstand and crashing to the ground. The electronic park brake system stabilizes the bike and prevents it from rolling forward.

In the various embodiments disclosed herein, the electronic park brake system is described in connection with an electric motorcycle. However, it should be understood that this is by way of example only, and that the system can also be applied to other electric vehicles (including electric tricycles, electric ATVs, etc.), and is especially advantageous in those vehicles having generally open access to the driver's area controls.

Figure 2:
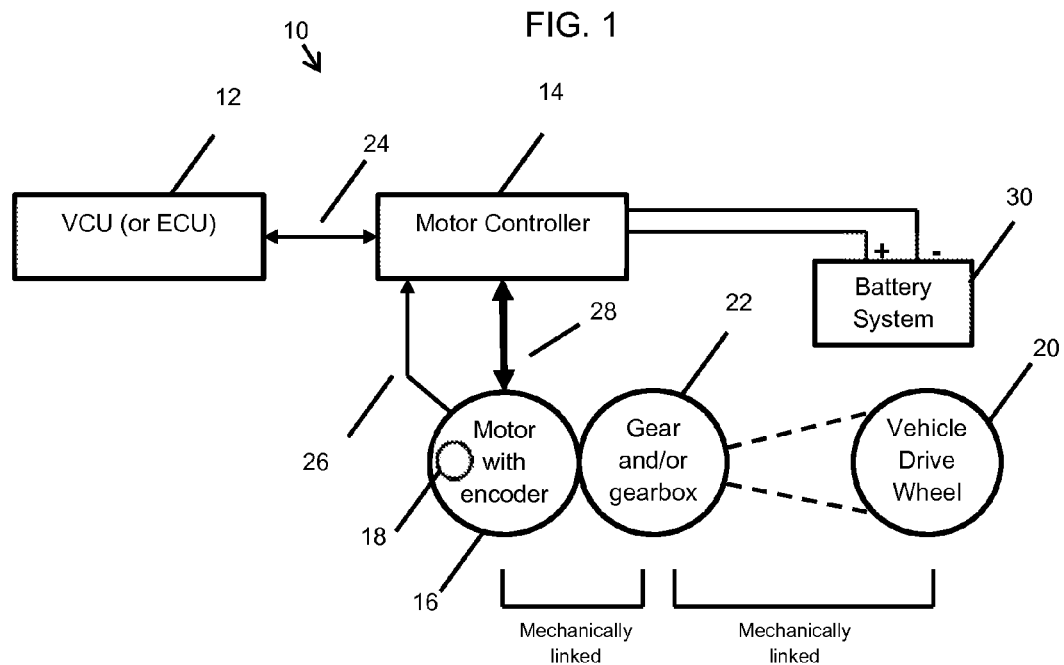
FIG. 2 is a block diagram of an exemplary electric vehicle, illustrating implementation of the electronic park brake system in accordance with one or more embodiments.

FIGS. 1 and 2 illustrate one exemplary implementation of the electronic park brake system in an electric vehicle 10 (in this example an electric motorcycle) in accordance with one or more embodiments. The electric vehicle includes a vehicle control unit (VCU) 12, which controls the basic operations of the electric vehicle. The VCU 12 is sometimes referred to as the engine control unit (ECU), but is referred to herein as the VCU. It is understood that the two names are interchangeable.

The VCU 12 includes a processor or a group of processors that handle most of the common functions of an electric vehicle. These includes tasks such as charging control, discharge control, vehicle status and diagnostics, speed calculations, etc. As a result, the VCU 12 is aware of the electric vehicle system as a whole and is the basic component qualified to handle the various states for the electronic park brake system.

The motor controller (MC) 14 receives commands from the VCU 12 (and a few other components of the electric vehicle such as the throttle), and translates these inputs to signals that drive the motor 16. The MC 14, in order to drive the motor 16 correctly, should precisely know the position of the motor rotor (shaft) at all times. This motor position is given by a position encoder 18 mounted on the motor 16 itself. Position encoders generally have very fine resolution and can determine the motor position to within 1 degree. Some encoders have even finer resolutions, determining positions within a fraction of a degree. As a result, even a minute rotation of the motor 16 can be detected and acted upon.

Electric motor rotational speeds (RPM) are usually geared down considerably by the time it reaches the drive wheel 20. As an example, an electric motor for an electric motorcycle will typically spin at several thousand RPMs for highest efficiency. However, it is necessary for the rear wheel to spin much lower RPM. The net effect is that for each revolution of the rear wheel, the motor will complete several times as many revolutions. This allows the motor encoder 18—which measures the motor position—to detect wheel movement in even smaller increments. The actual final resolution will be dependent on the gearing 22 of the bike (lower gears will result in finer resolution than higher gears) and the resolution of the encoder 18 itself, but the final effect is the ability to measure wheel rotation in fractions of a degree as a result of the vehicle gearing 22.

FIG. 2 illustrates the basic drive system for the electric vehicle. The VCU 12 and motor controller 14 communicate through a high-speed data link 24. The motor controller 14 acts upon these and other inputs such as signals 26 from the motor position encoder 18 to determine how to drive the motor 16. Typically the motor controller 14 produces the drive signals 28 to the motor 16 that propel the vehicle either forward or backwards. On occasion there will be no current to drive the motor 16, but if the vehicle is moving forwards (e.g., rolling downhill) on its own, the motor 16 acts as a generator and will feed voltage back to the motor controller 14 where it can be used to recharge the battery system 30 of the vehicle. This technique is commonly referred to as regenerative braking. Regenerative braking requires some minimum speed to be of practical use, and is generally not practical for small movements such as described herein.

Figure 3:
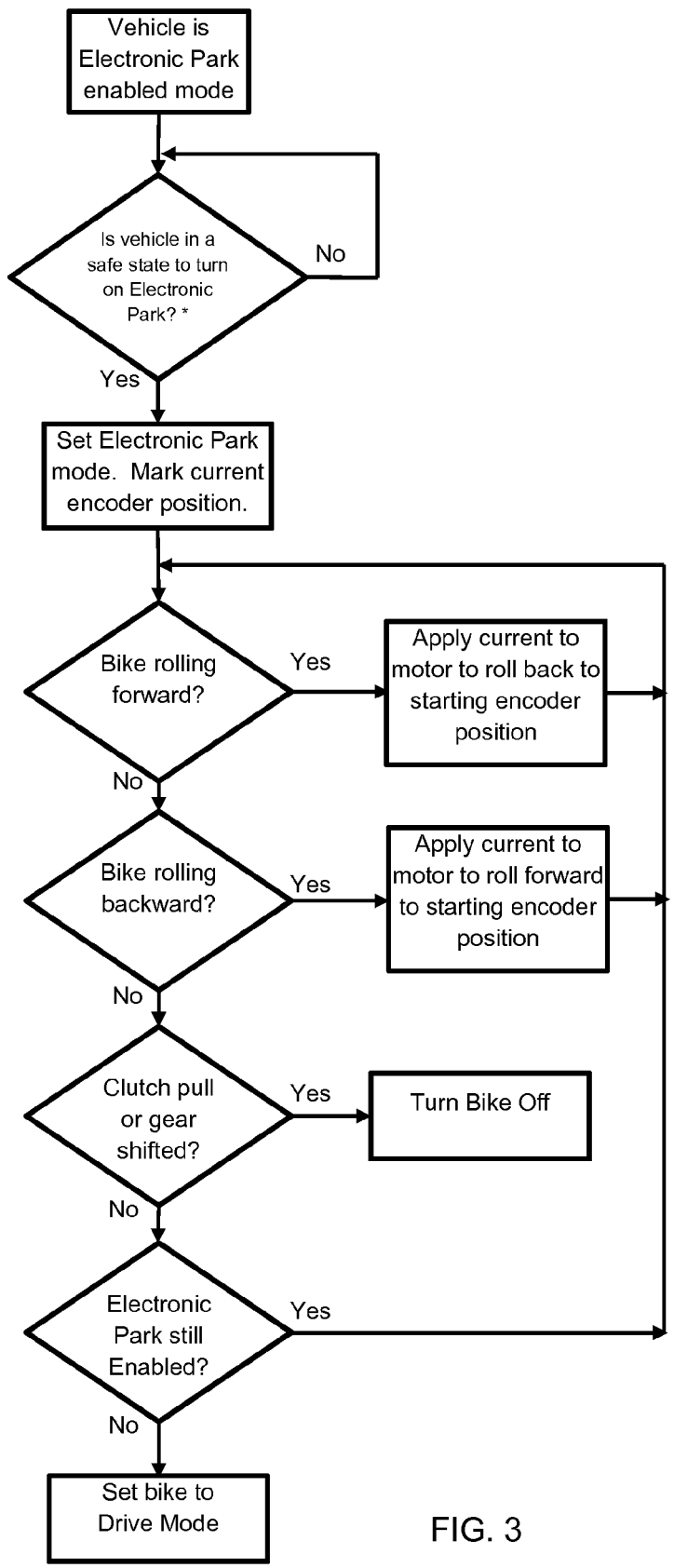
FIG. 3 is a flowchart illustrating operation of the electronic park brake system in accordance with one or more embodiments.

FIG. 3 illustrates an exemplary operation of the electronic park brake system in accordance with one or more embodiments.

The electric vehicle is in an electronic park brake mode when the vehicle is stationary and in a parked position without the rider present on the vehicle. In this mode, the VCU 12 and motor controller 14 are active, but in general not supplying power to the motor 16. When the vehicle is moved without the rider, the VCU 12 will instruct the motor controller 14 to apply a force to the drive train to prevent the wheel(s) from moving any further—or to move it back to the original position.

Since the motor encoder 18 can detect very small movements in the wheel's rotation, it allows the motor controller 14 to determine whether the bike is completely stopped or starting to move. Depending on the position it reads, the motor encoder 18 can supply information to the motor controller 14 to help it determine which way the vehicle is moving. The motor controller 14 can relay this information to the VCU 12, and if the VCU 12 has determined that the vehicle is already placed in the Electronic Park mode, it can instruct the motor controller 14 to generate signals to the motor 16 that forces it (and the vehicle's drive wheel) back to the original position.

The requirement for the motor controller 14 and VCU 12 to be powered on is the same as it would be for the vehicle when it is fully on and driving. Thus, the motorcycle can be ready to immediately drive once an authorized signal is received.

In accordance with one or more embodiments, various conditions need to be met to prevent accidental engagement of the Electronic Park mode while the vehicle is being driven. In this particular example, for an electric motorcycle, all of the following three conditions should be met:
 (1) the vehicle speed must be 0 mph (the vehicle is at a complete stop);
 (2) the kickstand must be down; and
 (3) an authorized signal, switch, or condition (e.g., key removed) must occur before the vehicle can be switched into the Electronic Park mode.

In this example, to re-enter the drive mode from the electronic park mode, the following two steps must occur:
 (1) the Electronic Park Mode is unlocked, e.g., via an authorized signal or insertion of a valid key; and
 (2) the kickstand is pushed up.

The electric motorcycle is now drivable.

Open cab electric vehicles with more than two wheels (e.g., tricycles and ATVs) have no kickstand. In this case, alternate methods (such as, e.g., use of a seat switch to detect a driver)

can be used to determine the presence or absence of a driver on the vehicle. In this example, a sequence such as the following could be used:
(1) the vehicle speed must be 0 mph (the vehicle is at a complete stop);
(2) the seat switch must show no presence of the driver; and
(3) an authorized signal, switch, or condition (e.g., key removed) must occur before the vehicle can be switched into the Electronic Park mode.

In this example, to re-enter the drive mode from the electronic park mode, the following two steps must occur:
(1) the Electronic Park Mode is unlocked, e.g., via an authorized signal or insertion of a valid key; and
(2) the driver is sitting on the seat as detected by the seat switch.

The electric vehicle is now drivable.

Other combinations to detect the presence of the driver and the safe condition of the vehicle to enter and exit the electronic park mode are possible, and the present disclosure is not limited by the examples listed above. For instance, the throttle position (or foot pedal) can be used as part of an evaluation for safe entry/exit of Electronic Park mode. Other similar methods to detect safe transition points can be used to switch states, and it is understood that the methods discussed above are examples only and do not limit the scope of this disclosure.

An additional advantage of the Electronic Park Brake system is that electric motors—unlike their gas counterparts—have very little internal mass. There are no pistons, crankshaft, etc. in electric motors and, as such, electric motors can freely spin without power. When a motorcycle is parked facing downhill, it is important to not have the bike move forward and roll off the kickstand where it would then fall to the ground. Gas motorcycles are typically left in gear when parked downhill, so the motor's internal drive train mass acts as a resistive force to prevent further movement. For Electric Motorcycles, there is no such mass in the motor, and unintended kickstand roll-offs and resultant bike crash are a troublesome issue. The Electronic Park Brake fixes this by not letting the wheel roll forward—even on a downhill plane—so the bike remains firmly in place.

Figure 4:
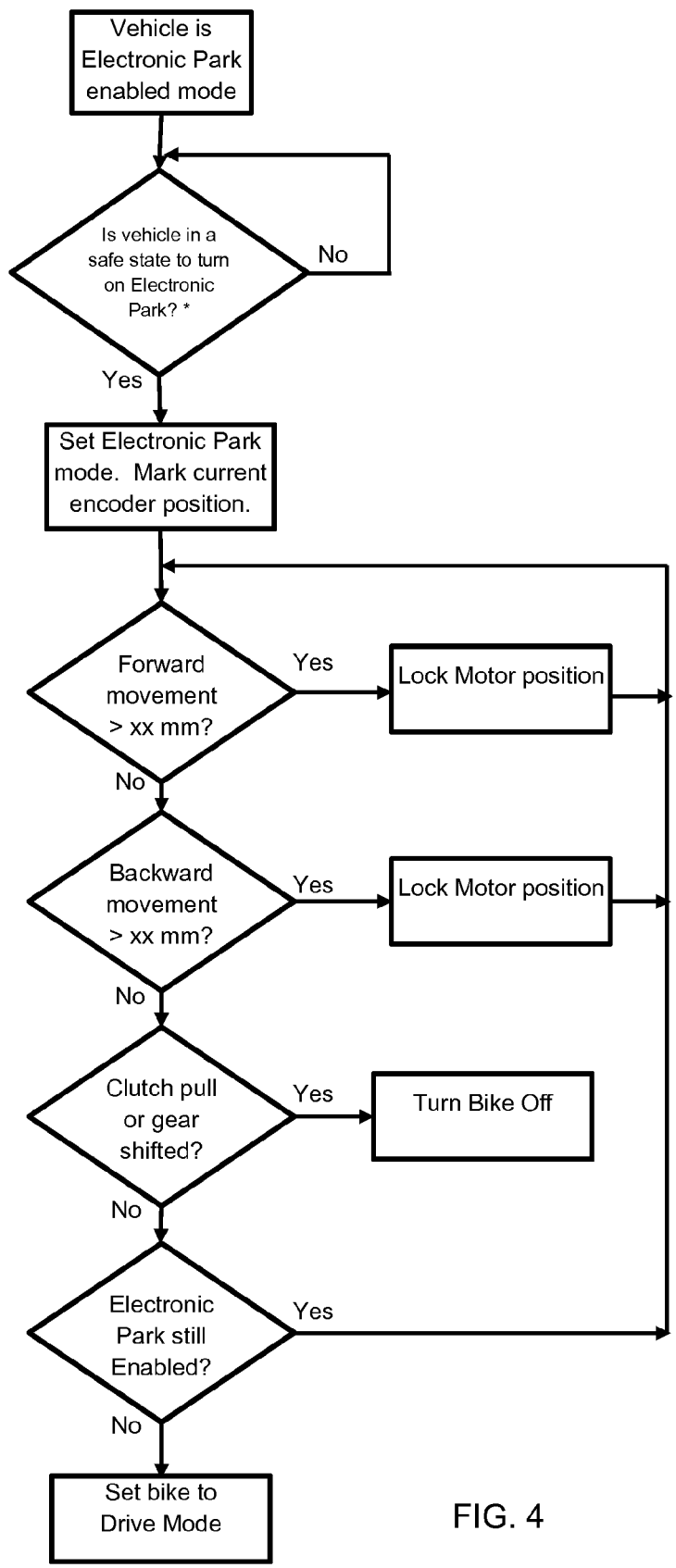
FIG. 4 is a flowchart illustrating operation of the electronic park brake system in accordance with one or more alternate embodiments.

As illustrated in the exemplary flow chart of FIG. 4, in accordance with one or more alternate embodiments, rather than locking the wheel firmly in place, the electronic park brake system can allow small incremental movement that allows for mechanical changes in suspension when the vehicle is parked and the rider exits the vehicle. In this case, the wheels may move slightly—and is not desired to engage the electronic park mode immediately. A small amount of movement is allowed before applying a signal to the motor 16 that would lock the rotor and wheels to prevent any further motion. The net effect is that it would be possible to move the vehicle very slightly before the drive wheel locks into place, but not enough to be of any significance in moving the vehicle's parked location.

After energizing the motor 16 to prevent further unauthorized motion, the motor signal can be deactivated after a period of time in order to conserve energy. If any further movement is detected after the motor signal is deactivated, the above process repeats again. If it is determined that there is continued rolling of the wheel (e.g., the bike is parked downhill, and there is continuous force to roll of the kickstand), the motor 16 can be continuously engaged to lock the vehicle in place.

In the case of a vehicle placed in low gear and having high motor encoder resolutions, any slight movement might cause readings that indicate positional changes of the vehicle. In this case, a variable sized buffer (dependent on gear selection) can be implemented for taking motor position measurements. As an example, the motor controller software may allow larger changes motor position as determined by the motor encoder 18 if the gearing is in first (low) gear than it would in sixth (high) gear.

If a person tries to bypass the Electronic Park mode by pulling in the vehicle's clutch, the motor 16 becomes mechanically unlinked from the wheel, so no amount of motor control will prevent the wheel from moving. In this case, the vehicle can then be turned off and electrically disabled until an authorized signal (or valid key insertion) is used to re-enable it.

The processes described above may be implemented in software, hardware, firmware, or any combination thereof. The processes are preferably implemented in one or more computer programs executing on a programmable device (e.g., in the VCU 12) including a processor and a storage medium readable by the processor (including, e.g., volatile and non-volatile memory and/or storage elements). Each computer program can be a set of instructions (program code) in a code module resident in the storage medium.

Having thus described illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same or similar functions.

Accordingly, the foregoing description and drawings are by way of example only, and are not intended to be limiting.

What is claimed is:

1. In an electric vehicle having a drive wheel and an electric motor for driving the drive wheel, a method of securing the electric vehicle from unwanted movement when the electric vehicle is parked, the method comprising the steps of:
   (a) placing the electric vehicle in an electronic park brake mode when the electric vehicle is in an initial parked position;
   (b) automatically detecting that the electric vehicle is rolling from the initial parked position; and
   (c) responsive to automatic detection that the electric vehicle is rolling from the initial parked position in step (b), automatically causing the electric motor to apply a reverse torque to the drive wheel to return the electric vehicle to the initial parked position or automatically causing the electric motor to lock the drive wheel to inhibit further movement of the electric vehicle.

2. The method of claim 1, prior to placing the electric vehicle in an electronic park brake mode, determining that at least one condition has been met.

3. The method of claim 2, wherein said at least one condition includes the electric vehicle being at a complete stop.

4. The method of claim 2, wherein said at least one condition includes a kickstand of the electric vehicle being down.

5. The method of claim 2, wherein said at least one condition includes no person being present in or on the vehicle.

6. The method of claim 2, wherein said at least one condition includes an authorized action performed by a user to place the electric vehicle in the electronic park brake mode.

7. The method of claim 1, further comprising detecting a clutch pull or gear shift and, in response, shutting off power in the electric vehicle.

8. The method of claim 1, wherein step (b) comprises automatically detecting that the electric vehicle has moved beyond a set distance.

9. The method of claim 1, wherein the electric vehicle includes a motor controller for controlling operation of the electric motor, said motor controller being active while the electric vehicle is in the electronic park brake mode.

10. The method of claim 1, further comprising receiving an authorized unlock signal from an action by a user to change the state of the electric vehicle from the electronic park brake mode to a drive mode.

11. The method of claim 1, wherein step (b) is performed by detecting movement of a rotor of the electric motor using a position encoder.

12. The method of claim 1, wherein the electric vehicle comprises an electric motorcycle, an electric tricycle, or an electric all-terrain vehicle.

13. An electric vehicle, comprising:
a battery system for powering the electric vehicle;
a drive wheel;
an electric motor mechanically coupled to the drive wheel for driving the drive wheel; and
a vehicle control unit for controlling operation of the electric motor through a motor controller, the vehicle control unit operable to secure the electric vehicle from unwanted movement when the electric vehicle is parked, the vehicle control unit configured to:
(a) place the electric vehicle in an electronic park brake mode when the electric vehicle is in an initial parked position;
(b) automatically detect that the electric vehicle is rolling from the initial parked position; and
(c) responsive to automatic detection that the electric vehicle is rolling from the initial parked position in step (b), automatically cause the electric motor to apply a reverse torque to the drive wheel to return the electric vehicle to the initial parked position or automatically cause the electric motor to lock the drive wheel to inhibit further movement of the electric vehicle.

14. The electric vehicle of claim 13, wherein the vehicle control unit is further configured to determine that at least one condition has been met prior to placing the electric vehicle in an electronic park brake mode.

15. The electric vehicle of claim 14, wherein said at least one condition includes the electric vehicle being at a complete stop.

16. The electric vehicle of claim 14, wherein said at least one condition includes a kickstand of the electric vehicle being down.

17. The electric vehicle of claim 14, wherein said at least one condition includes no person being present in or on the vehicle.

18. The electric vehicle of claim 14, wherein said at least one condition includes an authorized action performed by a user to place the electric vehicle in the electronic park brake mode.

19. The electric vehicle of claim 13, wherein the vehicle control unit is further configured to detect a clutch pull or gear shift in the electric vehicle and, in response, shut off power in the electric vehicle.

20. The electric vehicle of claim 13, wherein the vehicle control unit is further configured to automatically detect that the electric vehicle has moved beyond a set distance.

21. The electric vehicle of claim 13, wherein the vehicle control unit and the motor controller are active while the electric vehicle is in the electronic park brake mode.

22. The electric vehicle of claim 13, wherein the vehicle control unit is further configured to receive an authorized unlock signal from an action by a user to change the state of the electric vehicle from the electronic park brake mode to a drive mode.

23. The electric vehicle of claim 13, further comprising a position encoder in the electric motor for detecting movement of a rotor of the electric motor and, in response, signaling the vehicle control unit.

24. The electric vehicle of claim 13, wherein the electric vehicle comprises an electric motorcycle, an electric tricycle, or an electric all-terrain vehicle.

* * * * *